United States Patent
Ganille et al.

(10) Patent No.: US 12,217,330 B2
(45) Date of Patent: Feb. 4, 2025

(54) METHOD AND DEVICE FOR GENERATING LEARNING DATA FOR AN ARTIFICIAL INTELLIGENCE MACHINE FOR AIRCRAFT LANDING ASSISTANCE

(71) Applicant: THALES, Courbevoie (FR)

(72) Inventors: Thierry Ganille, Mérignac (FR); Guillaume Pabia, Mérignac (FR); Christian Nouvel, Mérignac (FR)

(73) Assignee: THALES, Courbevoie (FR)

( * ) Notice: Subject to any disclaimer, the term of this patent is extended or adjusted under 35 U.S.C. 154(b) by 337 days.

(21) Appl. No.: 17/774,807

(22) PCT Filed: Nov. 3, 2020

(86) PCT No.: PCT/EP2020/080803
§ 371 (c)(1),
(2) Date: May 5, 2022

(87) PCT Pub. No.: WO2021/089536
PCT Pub. Date: May 14, 2021

(65) Prior Publication Data
US 2022/0406040 A1    Dec. 22, 2022

(30) Foreign Application Priority Data

Nov. 7, 2019    (FR) .................................. 1912484

(51) Int. Cl.
| | | |
|---|---|---|
| *G06T 11/00* | (2006.01) | |
| *G06T 5/50* | (2006.01) | |
| *G06V 10/44* | (2022.01) | |
| *G06V 10/774* | (2022.01) | |
| *G06V 10/82* | (2022.01) | |
| *G06V 20/10* | (2022.01) | |

(52) U.S. Cl.
CPC ................ *G06T 11/00* (2013.01); *G06T 5/50* (2013.01); *G06V 10/454* (2022.01);
(Continued)

(58) Field of Classification Search
CPC ........... G06T 11/00; G06T 5/50; G06V 10/82; G06V 20/176; G06V 10/774; G06V 10/454
See application file for complete search history.

(56) References Cited

U.S. PATENT DOCUMENTS

| | | |
|---|---|---|
| 5,420,582 A | 5/1995 | Kubbat et al. |
| 8,264,498 B1 | 9/2012 | Vanderkamp et al. |
| 2016/0171758 A1 | 6/2016 | Dominici et al. |

FOREIGN PATENT DOCUMENTS

| | | |
|---|---|---|
| EP | 2 154 665 A2 | 2/2010 |
| FR | 2 996 670 A1 | 4/2014 |

(Continued)

OTHER PUBLICATIONS

Bicer, Y., Moghadam, M., Sahin, C., Eroglu, B., & Üre, N. K. (2019). Vision-based uav guidance for autonomous landing with deep neural networks. In AIAA Scitech Jan. 7, 2019 Forum (p. 0140). (Year: 2019).*

(Continued)

*Primary Examiner* — David Perlman
(74) *Attorney, Agent, or Firm* — BakerHostetler

(57) ABSTRACT

A computer-implemented method for generating labeled training data for an artificial intelligence machine is provided. The method comprises at least the steps of: defining parameters for a scenario of an aircraft approaching a runway; using the parameters of the scenario in a flight simulator to generate simulated flight data, the flight simulator being configured so as to simulate the aircraft in the approach phase and an associated autopilot; using the simulated flight data in a sensor simulator to generate simulated sensor data, the sensor simulator being configured so as to simulate a forward-facing sensor on board an aircraft and able to provide sensor data representative of information of interest of a runway, the simulated sensor data that are (Continued)

generated being representative of information of interest of the runway; and using the simulated flight data and the simulated sensor data to generate a ground truth, the ground truth associated with the simulated sensor data forming a pair of simulated labeled training data.

10 Claims, 6 Drawing Sheets

(52) U.S. Cl.
CPC ............ *G06V 10/774* (2022.01); *G06V 10/82* (2022.01); *G06V 20/176* (2022.01); *G06T 2207/10048* (2013.01)

(56) References Cited

FOREIGN PATENT DOCUMENTS

| FR | 3 058 233 A1 | 5/2018 |
| WO | 2013/061066 A1 | 5/2013 |
| WO | 2017/040691 A1 | 3/2017 |

OTHER PUBLICATIONS

Mori, R., Suzuki, S., & Takahara, H. (2007, May). Optimization of neural network modeling for human landing control analysis. In AIAA Infotech@ Aerospace 2007 conference and exhibit (p. 2840). (Year: 2007).*

Bonjean, M. E., Schiefele, J., & Verly, J. G. (2005, June). Multisensor Flight Simulation with Emphasis on Synthesis of IR Imagery. In Proc. of"Joint International Symposium on Sensors and Systems for Airport Surveillance"(JISSA). (Year: 2005).*

Corwin, et al., "Synthetic Terrain Imagery for Helmet-Mounted Display. vol. 1", 1994. https://apps.dtic.mil/sti/citations/ADA293612.

Hamza, et al., "Runway Positioning and Moving Object Detection Prior to Landing", Augmented Vision Perception in Infrared, Algorithms and Applied Systems, pp. 243-269, 2009.

Mckeown, et al., "Rule-Based Interpretation of Aerial Imagery", IEEE Transactions on Pattern Analysis and Machine Intelligence, vol. PAMI-7, No. 5, pp. 570-585, Sep. 1985.

\* cited by examiner

METHOD AND DEVICE FOR GENERATING LEARNING DATA FOR AN ARTIFICIAL INTELLIGENCE MACHINE FOR AIRCRAFT LANDING ASSISTANCE

CROSS-REFERENCE TO RELATED APPLICATIONS

This application is a National Stage of International patent application PCT/EP2020/080803, filed on Nov. 3, 2020, which claims priority to foreign French patent application No. FR 1912484, filed on Nov. 7, 2019, the disclosures of which are incorporated by reference in their entirety.

FIELD OF THE INVENTION

The invention relates to the general field of landing assistance systems for aircraft, and in particular proposes a method and a device for generating training data able to be used by a deep learning artificial intelligence machine to recognize a runway.

BACKGROUND

In particular, the invention addresses the problem of recognizing a runway in challenging weather conditions, such as fog for example, leading to reduced or degraded visibility.

Aviation standards impose rules in respect of the visibility to be obtained during the landing phase. These rules are reflected in decision thresholds that refer to the altitude of the airplane during its descent phase. At each of these thresholds, identified visual markers must be obtained in order to continue the landing maneuver, without which said maneuver has to be abandoned. Abandoned landing maneuvers represent a real problem for air traffic control and for flight planning. It is necessary, before take-off, to estimate the ability to be able to land at a destination on the basis of weather forecasts, these being more or less reliable, and where applicable to provide backup solutions.

Therefore, the problem of landing aircraft in conditions of reduced visibility, in addition to the visual identification performed by the pilot in sensor data, has been subject to the development of multiple approaches, such as the instrument landing system (ILS), the synthetic vision system (SVS), the augmented vision technique known as EVS or EFVS ("Enhanced (Flight) Vision System") or even CVS ("Combined Vision Systems") visualization systems.

EVS, EFVS and CVS systems are based on presenting a sensor image to the pilot and on said pilot identifying the runway, and are based on sensors facing in front of the aircraft that provide an increased detection capability in comparison with the pilot's eye, in particular in conditions of degraded visibility. However, this type of sensor does not make it possible to systematically detect the runway in degraded visibility before the regulatory minima, typically before the aircraft is below a height of 200 ft above the runway threshold for a Category I ILS approach.

Passive sensors, as they are known, such as IR sensors in the infrared range, rely on parasitic infrared radiation from lamps present in the vicinity of the runway. For reasons of lamp service life and therefore cost, the current trend is to replace incandescent lamps with LED lamps. These have a narrower spectrum in the infrared range. One upshot is therefore that of making infrared sensor-based EVS systems technically obsolete.

One alternative to infrared sensors is to obtain images using an active sensor, as it is known, such as a radar sensor, in the centimeter or millimeter band. Some frequency bands chosen outside the absorption peaks of water vapor exhibit very low sensitivity to challenging weather conditions. Such sensors therefore make it possible to produce an image through fog for example. However, even though these sensors have a fine distance resolution, they have an angular resolution that is far coarser than optical solutions. Resolution is linked directly to the size of the antennas that are used, and it is often too coarse to obtain an image easily able to be interpreted by the pilot to serve as guidance.

The emergence of the use of active sensors, such as for example millimetric lidars ("Light Detection and Ranging") or radars, which are capable of detecting the runway from further away and in almost any visibility conditions, has led to much better results than passive sensors such as IR cameras. However, the data coming from such active sensors do not make it possible to generate an image that is as clear and able to be interpreted as easily as an IR image. The problem then arises of the pilot being able to identify the runway in sensor data notably coming from active sensors facing in front of the aircraft.

Some image processing solutions dedicate the task of identifying the runway to an algorithm rather than to the pilot.

Current image processing operations use conventional algorithms (detection of lines, corners, etc.) to identify the runway. However, the recognition of a runway in a sensor image in poor visibility may be unreliable with conventional algorithms. Indeed, each degraded weather condition is specific, and some conditions may render the runway detection algorithms ineffective. This then results in reduced performance of the piloting or display computers that use imaging for aerial operations.

Recent approaches for improving image processing algorithms for aerial operations linked to landing in poor weather conditions leading to reduced or degraded visibility implement algorithms based on artificial neural networks.

An artificial neural network is a system whose design was originally schematically inspired by the functioning of biological neurons, and which subsequently moved toward statistical methods. Neural networks are usually optimized by machine learning methods.

Thus, the vast majority of artificial neural networks have a learning or training algorithm, which consists in modifying synaptic weights based on a set of data presented at input of the network. The purpose of this training is to allow the neural network to learn from the examples and to produce trained artificial intelligence models.

Deep learning forms part of the family of machine learning methods. Machine deep learning has to be performed on sufficiently large databases capable of training large systems. New data may be added to the training base continuously to refine the training.

The conventional method for generating training databases for algorithms based on deep-learning artificial intelligence consists in using real data, which are labeled manually or with minimally automated tools, in order to generate a ground truth VT.

One of the foundations for the success of deep learning is the creation of a large training database. However, in the context of the invention, in which the training data come from real sensor images, the problem is the variability of the conditions, and lies in the difficulty in obtaining a large number of sensor images for various approaches toward various runways, with various approach lighting strips, in various weather conditions and for various aircraft.

Moreover, another obstacle to enriching training databases in the context of the invention is the cost of flights to collect images, meaning that the number of flights remains highly limited.

Therefore, the image bank that compiles all of the collected sensor images is still currently too small.

However, the volume of such an image bank has to reach a sufficient threshold in order for the content (the training data) to be reliable both in terms of precision and in terms of geographical coverage.

SUMMARY OF THE INVENTION

One aim of the invention is then to address the aforementioned needs and to overcome the drawbacks of known techniques.

Therefore, the invention proposes a solution for generating labeled training data, which may be used by a deep learning image processing algorithm in order to generate trained artificial intelligence models, which are embedded in aircraft landing assistance systems.

To this end, one subject of the invention is a solution for automatically generating training data aimed at training an artificial intelligence to recognize a runway for an aircraft in conditions of degraded visibility.

Thus, advantageously, images obtained by a synthetic image generator according to the method of the invention may be used on their own or added to a bank of real images as additional training data.

The general principle of the invention is based on using a flight simulator associated with a sensor simulator configured so as to provide simulated sensor data, as well as on using an automatic labeled data generator configured so as to mask, in the labeled data, those parts that are without information in the corresponding simulated sensor data.

Advantageously, the simulated data coming from simulated sensor images and made available in a training database are used to train various classification and detection artificial intelligence algorithms, notably algorithms based on deep neural networks.

In one embodiment, the artificial intelligence algorithm for deep learning is based on a convolutional neural network (CNN).

Advantageously, a training database formed of simulated and/or real sensor images may be used to validate the robustness or the weakness of various training algorithms with respect to various scenarios ("use cases") that are considered to be problematic, by making it possible to run various algorithms in parallel on the set of data and to detect excessively large differences between the various algorithms in the results that are provided.

The device (and the method) of the invention thus make it possible, by simulating more different conditions than is possible with only real data, to generate a much larger training database, and thus to considerably increase the detection capability of a runway recognition system using trained models that are obtained from the training database formed according to the invention.

The present invention will be applied in many fields, and notably in applications for the detection of runways, runway contours, lighting strips and approach lighting strips.

To obtain the desired results, what is proposed is a computer-implemented method for generating labeled training data able to be used by an artificial intelligence machine implementing a deep learning image processing algorithm, the method comprising at least the steps of:
  defining parameters for a scenario of an aircraft approaching a runway;
  using the parameters of the scenario in a flight simulator to generate simulated flight data, said flight simulator being configured so as to simulate said aircraft in the approach phase and an associated autopilot;
  using the simulated flight data in a sensor simulator to generate simulated sensor data, said sensor simulator being configured so as to simulate a forward-facing sensor on board an aircraft and able to provide sensor data representative of information of interest of a runway, said simulated sensor data that are generated being representative of information of interest of said runway; and
  using the simulated flight data and the simulated sensor data to generate a ground truth, said ground truth associated with the simulated sensor data forming a pair of simulated labeled training data.

According to some alternative or combined embodiments:
  the step of defining scenario parameters consists in defining parameters relating to at least one given runway, weather conditions and environmental conditions.
  the step of generating simulated flight data consists in simulating various approach paths of the simulated aircraft and the autopilot with the scenario parameters, and in generating simulated flight data for the various paths comprising the position (latitude, longitude, altitude) and attitude (yaw, pitch, roll) of the simulated aircraft.
  the step of generating the simulated sensor data consists in generating infrared images or simulated radar data.
  the step of generating a ground truth consists in:
  generating a first-level ground truth comprising labeling data representative of characteristics of the simulated runway, without a visibility restriction;
  detecting the visibility limit by identifying areas without visibility in the simulated sensor data; and
  correcting the first-level ground truth with the identified areas without visibility in order to generate said ground truth.
  the visibility limit detection step consists in implementing a visibility limit detection algorithm on each set of simulated sensor data.
  the method additionally comprises a step consisting in generating a corrected ground truth control image by fusing each set of ground truth data with the corresponding simulated sensor data.
  the flight data and the sensor data are real data and the ground truth generation step comprises, before the first-level ground truth generation step, steps consisting in computing the positioning errors during landing in the real flight data and in taking these into consideration to generate the first-level ground truth.
  the method additionally comprises a step consisting in storing the simulated labeled training data in a training database.

The invention also covers a computer program product comprising code instructions for performing the steps of the claimed method when the program is executed on a computer.

The invention additionally covers a device for generating labeled training data able to be used by an artificial intelligence machine implementing a deep learning image processing algorithm, the device comprising means for implementing the steps of the claimed method as claimed in any one of the claims.

BRIEF DESCRIPTION OF THE DRAWINGS

Other features, details and advantages of the invention will become apparent on reading the description, which is given with reference to the appended drawings, which are given by way of example and in which, respectively.

DETAILED DESCRIPTION

Figure 1:
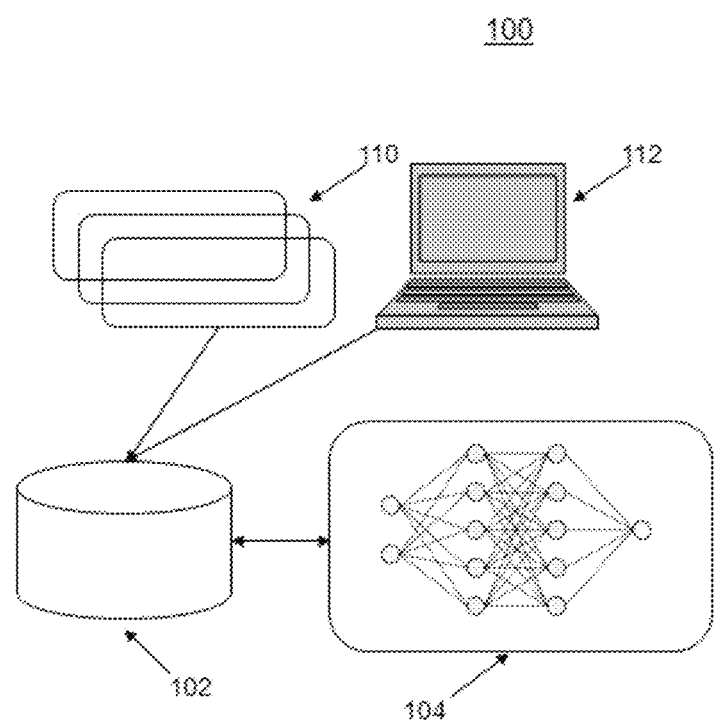
FIG. 1 shows a general architecture of an artificial intelligence model generation system trained for runway and approach lighting strip recognition, using a training database formed according to one embodiment of the invention.

FIG. 1 illustrates a general architecture of an artificial intelligence model generation system 100 trained for runway recognition, using a training database formed according to one embodiment of the invention.

The system 100 generally comprises a training database 102 coupled to an image analysis module 104 configured so as to implement a deep learning artificial intelligence algorithm and generate trained artificial intelligence models (AI models).

The training database 102 should contain a very large number of data representing a maximum number of possible situations, encompassing various approaches toward various runways with various approach lighting strips for various weather conditions. In order to implement a deep learning method and learn to recognize the runway in the data, the training database formed according to the principles of the invention comprises simulated training data in the form of a plurality sets of labeled data, in which each set of labeled data corresponds to a pair (simulated sensor data, ground truth VT).

The simulated sensor data correspond to a plurality of images from various simulated sensors (IR, Radar) respectively associated with a ground truth.

For simulated sensor data from synthetic IR images, the ground truth is a reference image, containing information of interest such as the runway and the approach lighting strip.

For simulated sensor data from a radar, the ground truth is a reference set of radar data containing information of interest such as a runway and an approach lighting strip.

In order to evaluate the performance of a classification algorithm, the result of a segmentation operation on an image at input of a classifier is compared with the ground truth.

The simulated training data of the training base 102 are provided by a device 112 able to generate simulated data (synthetic IR images and/or radar data) and their associated ground truth.

In one embodiment, real training data may be added to the simulated training database in order to augment the set of training data. The real training data come from sensors fitted to aircraft, be these images in the visible, in the infrared or radar data.

In one embodiment, the real images are provided by a multitude of different sensors fitted to a plurality of aircraft performing either real flights or flights dedicated to capturing images, each image being associated with parameters of the corresponding flight, and notably the 3D position and 3D orientation parameters of the aircraft at the time of the image capture.

The real training data may come from a community of image providers 110, which, within the meaning of the present invention, is understood to mean a set of devices in which each device is able to provide one or more real sensor images. The community of image providers may be a fleet of aircraft, an aircraft within the meaning of the present invention adopting a generic definition covering any flying machine, be this an airplane, a helicopter, a drone, a balloon, whether manned or unmanned.

Returning to FIG. 1, the image analysis module 104 is configured so as to implement a deep learning algorithm on sets of training data retrieved from the training database 102, and generate trained artificial intelligence models (AI models) that are able to be carried on board aircraft.

In one embodiment, the image analysis module 104 of the invention implements a deep learning algorithm to detect runways and approach lights. In one advantageous embodiment, the algorithm is based on a convolutional neural network CNN.

In the field of computer vision, the objective of deep learning is to model data with a high level of abstraction. In brief, there are two phases: a training phase and an inference phase. The training phase makes it possible to define a trained AI model that meets the operational need. This model is then used in the operational context during the inference phase. The training phase is therefore essential. In order to obtain the best model, the training phase requires having formed a large training database that is most representative of the operational context.

Good training defines a predictive model that fits the training data well, but that is also capable of correctly performing predictions on data not seen during training. If the model does not fit the training data, the model suffers from underfitting. If the model fits the training data too well and is not capable of generalizing, the model suffers from overfitting. Thus, based on the numerous labeled images from the training base 102, the training phase makes it possible to seek the best hyperparameters of the architecture that best model the various labels (runway/approach lighting strip). In each iteration, the neural network propagates (that is to say extraction/abstraction of the characteristics specific to the objects of interest) and estimates the presence and position of the objects. Based on this estimate and the ground truth, the learning algorithm computes a prediction error and backpropagates the error in the network in order to update the hyperparameters of the model. A training phase comprises numerous iterations on the various training data in order to converge on a low error and high precision of the AI model.

Figure 2:
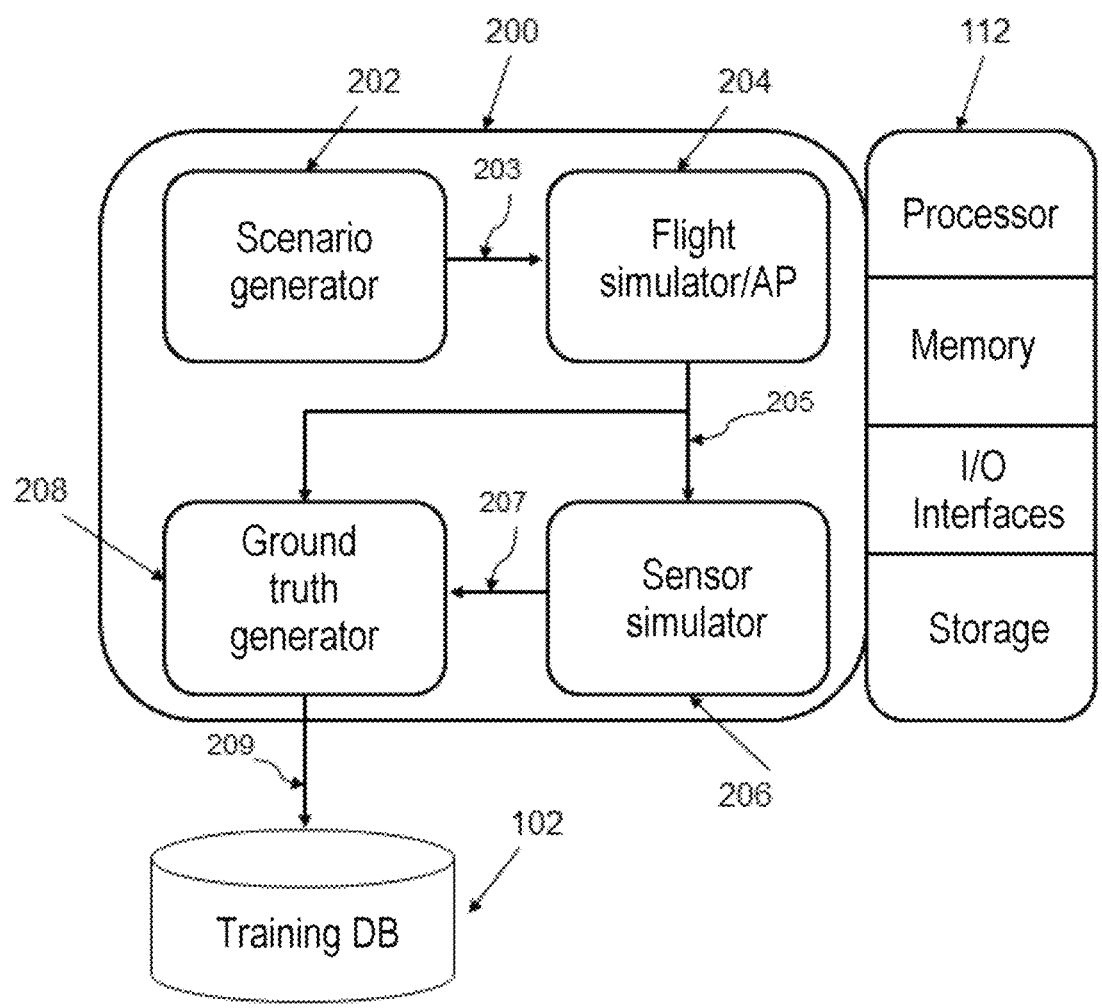
FIG. 2 shows a diagram of a synthetic image generation device according to one embodiment of the invention.

FIG. 2 shows a diagram of a device 200 for generating labeled training data according to one embodiment of the invention, which comprises multiple modules including a scenario generator 202, a flight simulator 204, a sensor simulator 206 and a ground truth generator 208.

In one embodiment, the device 200 for generating labeled training data is implemented in a computer 112 that comprises at least one processor, a memory configured so as to store code instructions of various programs including code instructions for executing the logical functions of the various modules of the device 200 that are able to be executed by the processor using an operating system, a storage module, input/output I/O interfaces to peripherals, interconnection buses, as known.

The device 200 of the invention may thus be implemented based on hardware and/or software elements. It may be available on a computer-readable medium in the form of a computer program product, able to be executed by a processor that comprises instructions for executing the steps of the methods in their various embodiments.

The device 200 of the invention is configured so as to generate synthetic images with an associated ground truth, which may be added to a training database 102 as training data.

The flight simulator 204 is configured so as to simulate an aircraft type with an associated autopilot (AP), the assembly forming a software module Flight/AP configured so as to simulate realistic approach paths toward various runways and in various weather conditions. The dimensioning weather factors are the visibility conditions that will define the graphic rendering of the approach lights and the runway, as well as wind and turbulence, which will influence the orientation and the stability of the simulated sensor in relation to the runway.

Advantageously, the module Flight/AP 204 may be configured so as to successively perform a determined number of approaches by varying various parameters, such as for example the runway on which the aircraft will land, wind direction and wind speed and turbulence level.

For this purpose, the scenario generation module 202 makes it possible to automatically initialize the module Flight/AP 204 at the start of the approach with initialization parameters 203 for a given runway, a given weather condition and initial parameters of the aircraft. The flight module associated with the autopilot performs the complete approach until landing with the initial parameters, and then the scenario generation module reinitializes the flight module with new conditions 203. Thus, advantageously, the module Flight/AP 204 may be configured so as to automatically perform a very large number of approaches with multiple initial conditions.

In one embodiment, the scenario generator 202 is configured so as to parameterize environmental conditions, such as for example the time and the date, which make it possible to position the sun or to simulate night-time conditions, as well as visibility, fog, rain, etc.

In one embodiment, parameters regarding the position of the runway threshold are input data for the module Flight/AP in order to simulate approaches that are slightly laterally and/or longitudinally offset from the runway, as could occur in manual piloting or with a slightly biased offset ILS beam or with an LPV approach with a small GPS location error. The position of the runway threshold is parameterized in the module Flight/AP via the scenario generation module 202 (and not in the sensor simulator), the autopilot thus guiding the aircraft toward the offset runway providing a view at a slightly different runway angle than the sensor data.

The flight simulator 204 generates simulated flight data 205 for a simulated aircraft type. The flight data, which are the position (latitude, longitude, altitude) and the attitude (yaw, pitch, roll) of the aircraft, become the input parameters for the sensor simulator 206 and for the ground truth generator 208.

The sensor simulator 206 is configured so as to simulate an on-board sensor facing in front of the aircraft and capable of providing data characteristic of a runway (information of interest) and of its environment, even in conditions of degraded visibility. The sensor simulator 206 receives the position and attitude parameters 205 of the aircraft that are provided by the module Flight/AP 204 and generates simulated sensor images.

The simulated sensor data may be images in the visible, in the infrared or radar data. The simulated sensor may be a fixed IR camera positioned in the nose of the aircraft and oriented forward along the longitudinal axis of the aircraft and usually slightly downward, providing a continuous stream of black and white images.

The simulated sensor may be a combination of multiple specific cameras for various wavelength ranges in the infrared and the visible in order to maximize the ability of the sensor to detect elements of interest in degraded visibility.

The simulated sensor may be an active milimetric lidar or radar sensor. This type of sensor provides a stream of 3D data (elevation, azimuth, reflectivity, distance).

The sensor simulator 206 is preferably configured according to the type of sensor that will be used on board the real aircraft that will carry the final system, be this for example an IR camera or else a millimetric radar.

Figure 4A:
FIG. 4a-FIG. 4e show one example of generating a ground truth control image according to one embodiment of the invention.

The sensor simulator 206 provides simulated sensor data 207 at output, for example in the form of a simulated IR image as shown in FIG. 4a.

The sensor data from the simulated sensor 207 are inputs for the ground truth generator 208, which also receives the flight parameters 205 from the simulated aircraft.

The ground truth generator 208 is configured so as to automatically generate a ground truth 209 from the sensor data 207 and the flight data 205. The ground truth generator 208 synchronously receives the flight data 205 from the aircraft simulator 204 and the sensor data 207 from the sensor simulator 206.

The input data 205, 207 for the ground truth generator 208 are synchronous and consistent in that the flight data 205 generated by the module Flight/AP and processed directly by the ground truth generator 208 correspond to the same flight data 205 that were used to generate the sensor data 207.

In one embodiment, the flight parameters 205 are sent only to the sensor simulator 206, which synchronously sends the sensor data 207 and the flight data 205. In one particular implementation, the sensor simulator 206 sends an image associated with the corresponding aircraft parameters every 3 seconds.

In some embodiments simulating complex sensors, such as for example radars, a synthetic image generator has difficulty operating in real time because of the computing time needed to generate each image. Advantageously, the device of the invention may comprise a synchronization mechanism that guarantees the alignment of the flight parameters 205 with the sensor data 207.

In one embodiment, the device is coupled to a buffer system with a given sampling of the flight data 205 upstream of the sensor simulator, and then synchronous transmission of the flight data 205 and the sensor data 207 from the sensor simulator to the ground truth generator.

The ground truth generator 208 is configured so as to automatically generate a ground truth 209 for the simulated scenario.

Figure 3:
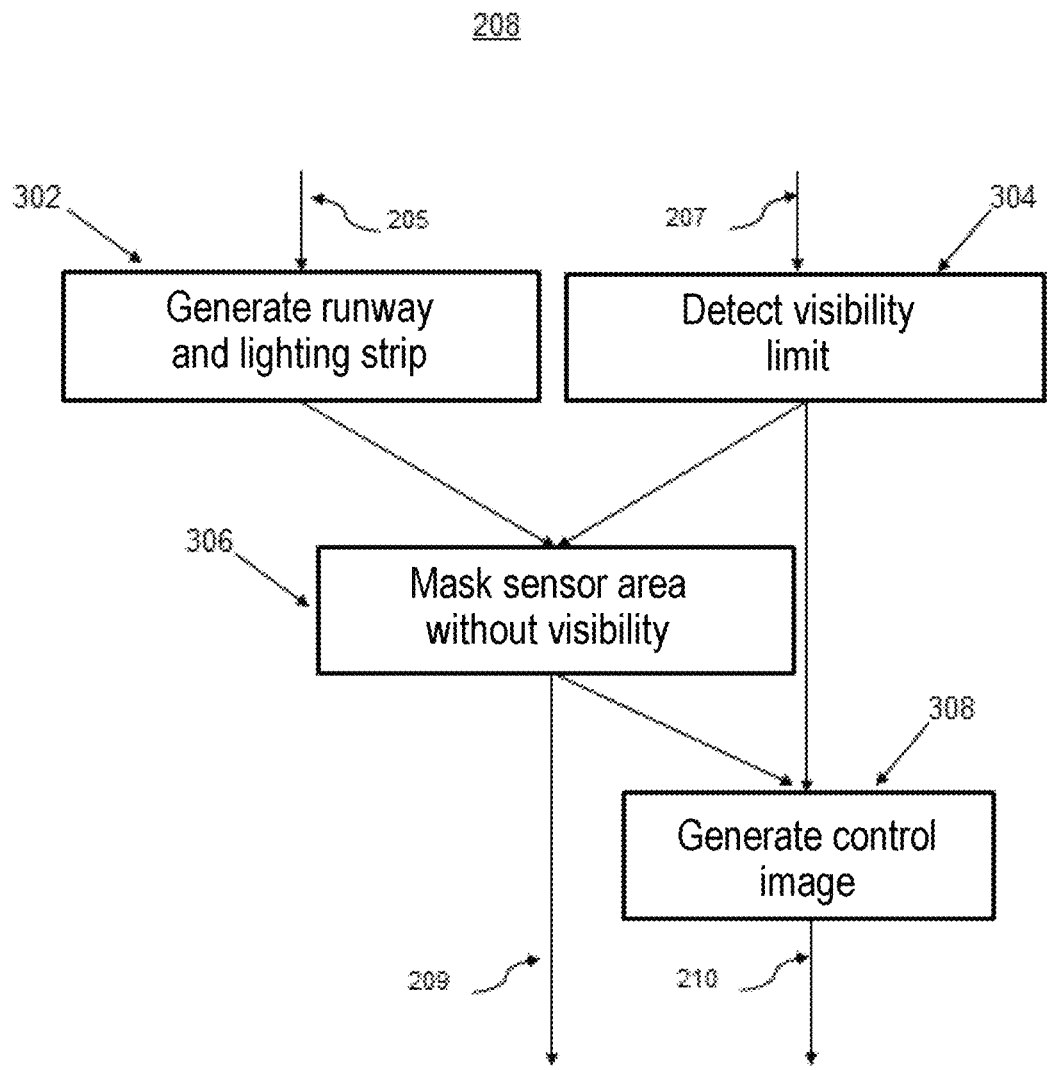
FIG. 3 shows a method for generating a ground truth according to one embodiment of the invention.

In one embodiment, the automatic ground truth generation takes place in three steps 302, 304, 306, illustrated in FIG. 3.

A step 302 consists in automatically generating, from the flight data 205 provided by the module Flight/AP 204, labeling data representative of characteristics of the simulated runway, without a visibility restriction.

The generated data are only theoretical data, as should come from the real sensor, with good visibility for the runway and the approach lighting strip defined for the scenario (to within the representativeness of the sensor model).

In conditions of degraded visibility, the approach lighting strip is generally able to be detected before the runway. Therefore, in order to achieve detection as early as possible, it is important to train the AI algorithm to recognize the various types of approach lighting strips, which are normalized. However, this is not always the case and the runway may sometimes be able to be detected directly first; for example, if the approach lighting strip consists of LEDs rather than incandescent lamps, an IR sensor may detect the runway before the approach lighting strip. This may also be the case for a radar that is able, from afar, to detect the contrast between the ground and the asphalt of the runway well before the contrast between the ground and the metal of the lighting strip, whose reflective surfaces are far too small. It is therefore important to train the AI algorithm to recognize the runway as well. Therefore, the ground truth generator of the invention may be parameterized so as to define the runway, that is to say the position of the two runway thresholds, the type of approach lighting strip used by the sensor simulator as well as the characteristics of the simulated sensor, that is to say the orientation of the sensor in the reference frame of the aircraft, the fields—horizontal and vertical—of the sensor and the type of data at output, for example for an image, the resolutions—horizontal and vertical—in pixels, any deformations, etc.

Figure 4B:
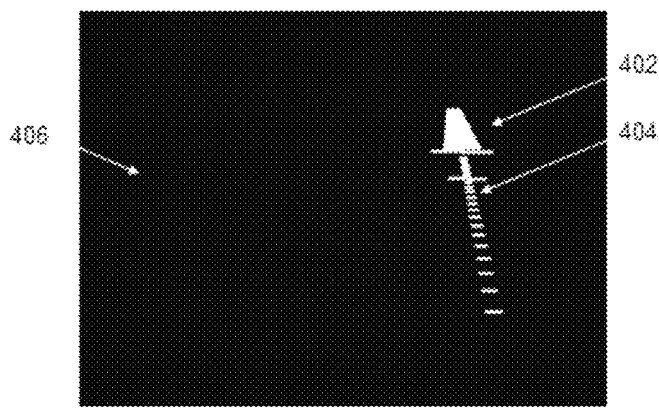

Thus, based on these data, the method makes it possible, in step 302, to generate very simplified pseudo sensor data containing only the runway in a first type of uniform information (402), the approach lighting strip in a second type of uniform information (404) and the rest of the data in a third type of uniform information (406). FIG. 4b illustrates a first-level ground truth obtained at the end of the first step 302 in the case of a sensor generating 2D images. This is a uniform image (black in FIG. 4b, but which could be red for example), with the runway and the lighting strip appearing in two other different colors (green for the runway and yellow for the lighting strip for example).

However, the simulated sensor reproduces the consequences of the simulated outdoor environment and, even if a runway is located within the field of the sensor, depending on the distance, visibility, weather conditions, date and time and type of sensor, the runway and its approach lighting strip may not be visible or only be partially visible.

Therefore, another step 304 performed by the ground truth generator consists in detecting the visibility limit by identifying areas without visibility in the sensor data from the simulated sensor, and then, in a following step 306, the method allows the areas without visibility that have been identified to be used to correct the first-level ground truth generated in the first step 302, based on the visibility distance in the sensor data from the simulated sensor, and generate a corrected ground truth 209.

Figure 4C:

Since the visibility distance is not obvious information to be ascertained a priori, even with sensor data from a simulated sensor, the method of the invention, in one embodiment, in step 304, implements a visibility limit detection algorithm on each set of sensor data 207. In the case of an IR image, such an algorithm may for example compute a contrast map of the image, followed by its variance and, depending on the result, then binarize the image using various thresholding operations in order to obtain a single border in the image 408 between the part with visibility, characterized by the presence of contrasting elements, and the part without visibility, which is more uniform, as illustrated in FIG. 4c.

One example of a visibility limit detection algorithm that may be implemented is described in the patent application FR3058233 from the Applicant. Those skilled in the art may however apply other known visibility detection algorithms.

The visibility limit detection step 304 makes it possible to provide a border 408 between an upper part of the sensor data, corresponding to the further away data without visibility, and a lower part of the sensor data, corresponding to the closer data with visibility.

Figure 4D:
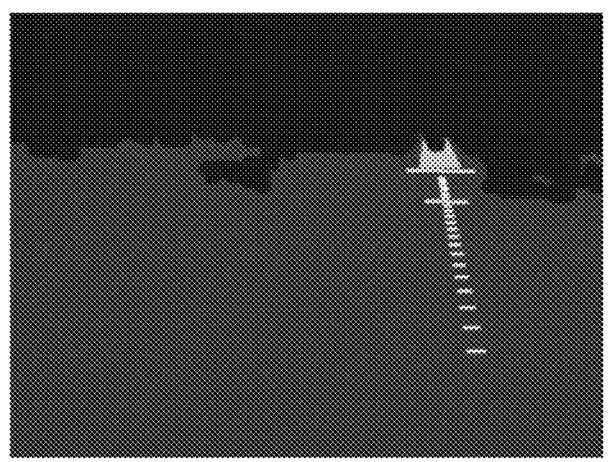

The border is used to mask the areas of the labeled data corresponding to the areas without visibility in the sensor data from said simulated sensor in the third step 306. A mask having a fourth type of uniform information and covering the part corresponding to the data without visibility is superimposed on the sensor pseudo-data resulting from the first step 302 in order to generate a corrected ground truth, as illustrated in FIG. 4d. On the example of the IR image, the upper part of the first-level ground truth image resulting from the first step and corresponding to the part without visibility in the simulated IR image may be masked with uniform information, which be a blue color for example.

Figure 4E:
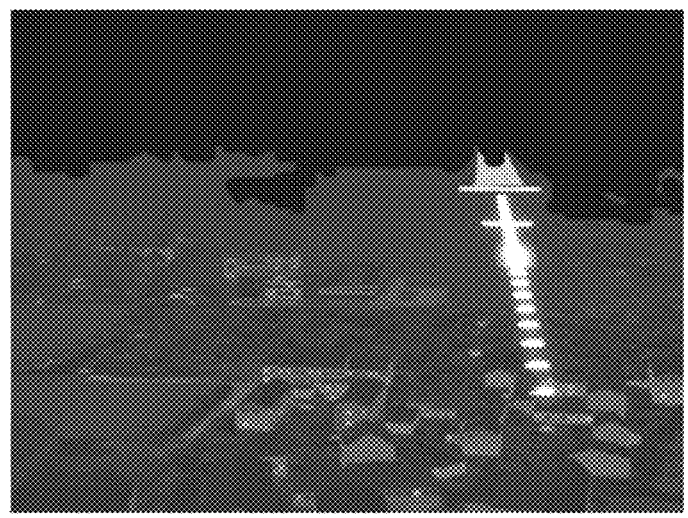

In one variant embodiment, the ground truth generator also makes it possible to generate 308 a corrected ground truth control image as illustrated in FIG. 4e, by fusing each set of ground truth data with the corresponding simulated sensor data.

Thus, in the case of an IR image for example, a predefined level of transparency is applied to the ground truth data from the second step 304 before superimposing them on the corresponding simulated sensor image in order to obtain a ground truth control image. Specifically, the transparency makes it possible to verify, in a checking step, that the runway and the approach lighting strip from the ground truth are perfectly superimposed on those of the sensor data from the simulated sensor, and only where they are visible in the sensor data.

In one embodiment, the check is based on a visual check by an operator, who may then activate automatic deletion of the various files from the database corresponding to the element that is subject to a negative check.

The device of the invention thus makes it possible, by successively implementing various scenarios, types of aircraft and on-board sensors, to generate a simulated database consisting of a plurality of sensor data from simulated sensors with a plurality of associated ground truths.

Advantageously, a set of data derived from the parameters of the aircraft may also be associated with the other simulated data in the database. In addition, some aircraft parameters may be added to the training data, such as for example heading deviation, altitude, or else DME distance from the runway. In the case of an infrared (IR) image, the associated ground truth is an image of the same size with a specific color for each element of the image that it is desired for the algorithm to learn to recognize.

The simulated database may be used as a training database to implement a deep learning algorithm for runway recognition, based on an artificial neural network, without the control data, which do not form part of the training data.

However, training based only on simulated data, regardless of the level of realism of the sensor simulation, is generally not sufficient, and it is important to be able to supplement the training database of simulated data with training data resulting from real data.

Thus, in one embodiment, data from real sensors during real flights are stored with aircraft parameters (at least those of position and attitude), and information regarding the synchronization of the sensor data is stored with the parameters of the aircraft. The difficulty in implementing the method of the invention on this type of data is in the first-level ground truth generation step (step 302), since the real parameters of the aircraft are generally slightly erroneous. Thus, a GPS position is precise to within a few meters with a maximum of the order of 30 meters, a GPS altitude is slightly less precise again, and a heading of the aircraft is known with a precision of a few tenths of a degree to 2 or 3 degrees, depending on the type of instrument providing the parameter. If these parameters were to be used directly in the method of the invention to position the runway and the approach lighting strip, it would not be possible to obtain superimposition of the ground truth on the corresponding data in the real sensor data. Therefore, the ground truth is created manually. However, since such an operation is tedious on a large volume of data, advantageously in one embodiment, an analysis of the parameters of the aircraft is performed at the time of touchdown on the runway and during the deceleration phase on the runway. Specifically, since the position and the altitude of the two runway thresholds are known precisely, it is possible to easily compute the runway heading, and since the aircraft is taxiing fairly precisely on the central axis of the runway during deceleration, it is easy to compute the heading error provided by the parameters of the aircraft and the GPS altitude error by comparing the altitude of the aircraft at touchdown with the altitude of the runway threshold by taking into account the height of the GPS antenna with respect to the ground and by taking multiple points during taxiing, and find an approximation of the latitude and longitude errors that makes it possible to correct the lateral deviation from the runway. However, there is still uncertainty regarding the longitudinal deviation from the runway, since it is never precisely known where the aircraft is located longitudinally on the runway, but this error has the least impact for the position of the runway in the ground truth. Once these errors have been identified, they are considered to be constant over the few seconds before landing, and they are backpropagated to the parameters of the aircraft during the final phase of the approach to generate the first-level ground truth (step 302). The following steps (304, 306) are identical to those described with reference to FIG. 3 for the simulated data, the parts without visibility are masked using a visibility limit detection algorithm, and control data may be generated. Data that are too erroneous may be deleted. This embodiment makes it possible to obtain complementary data for the simulated data training base, thus making it possible to improve the training phase of an AI algorithm.

In one embodiment, conventional methods for increasing the amount of data through rotation, translation, etc. operators are applied to expand the training base.

In one embodiment, the simulated training database is associated with a real training database in order to considerably increase the amount of training data.

The present invention thus describes various contexts for generating new data:

context for generating new simulated training data, through scenario simulation, and then generation of the ground truth associated with this simulation by taking, inter alia, the flight parameters as well as a limit detection algorithm for detecting limits between visible and invisible areas;

use of real data and then computing of the positioning error during a landing in order to backpropagate this error and reconstruct a ground truth associated with these real data.

The present description illustrates one preferred implementation of the invention, but this is not limiting. Some examples are chosen so as to allow a good understanding of the principles of the invention and a specific application, but these are in no way exhaustive, and should allow a person skilled in the art to provide modifications and implementation variants while keeping the same principles.

The invention claimed is:

1. A computer-implemented method for generating labeled training data able to be used by an artificial intelligence machine implementing a deep learning image processing algorithm, the method comprising at least the steps of:

defining parameters for a scenario of an aircraft approaching a runway;

using the parameters of the scenario in a flight simulator to generate simulated flight data, said flight simulator being configured so as to simulate said aircraft in the approach phase and an associated autopilot;

using the simulated flight data in a sensor simulator to generate simulated sensor data, said sensor simulator being configured so as to simulate a forward-facing sensor on board an aircraft and able to provide sensor data representative of information of interest of a runway, said simulated sensor data that are generated being representative of information of interest of said runway;

using the simulated flight data and the simulated sensor data to generate a ground truth, said ground truth associated with the simulated sensor data forming a pair of simulated labeled training data; and wherein the step of generating the ground truth consists in:

generating a first-level ground truth comprising labeling data representative of characteristics of the simulated runway, without a visibility restriction;

detecting the visibility limit by identifying areas without visibility in the simulated sensor data; and correcting the first-level ground truth with the identified areas without visibility in order to generate said ground truth.

2. The method as claimed in claim 1, wherein the step of defining scenario parameters consists in defining parameters relating to at least one given runway, weather conditions and environmental conditions.

3. The method as claimed in claim 1, wherein the step of generating simulated flight data consists in simulating various approach paths of the simulated aircraft and the autopilot with the scenario parameters, and in generating simulated flight data for the various paths comprising the position (latitude, longitude, altitude) and attitude (yaw, pitch, roll) of the simulated aircraft.

4. The method as claimed in claim 1, wherein the step of generating the simulated sensor data consists in generating simulated infrared images.

5. The method as claimed in claim 1, wherein the visibility limit detection step consists in implementing a visibility limit detection algorithm on each set of simulated sensor data.

6. The method as claimed in claim 1, additionally comprising a step of generating a corrected ground truth control image by fusing each set of ground truth data with the corresponding simulated sensor data.

7. The method as claimed in claim 1, wherein the flight data and the sensor data are real data and the ground truth generation step comprises, before the first-level ground truth generation step, steps consisting in computing the positioning errors during landing in the real flight data and in taking these into consideration to generate the first-level ground truth.

8. The method as claimed in claim 1, additionally comprising a step consisting in storing the simulated labeled training data in a training database.

9. A device for generating labeled training data able to be used by an artificial intelligence machine implementing a deep learning image processing algorithm, the device comprising means for implementing the steps of the method as claimed in claim 1.

10. A computer program comprising code instructions stored on a memory of a computer causing a processor of the computer to execute the steps of the method for generating labeled training data able to be used by an artificial intelligence machine implementing a deep learning image processing algorithm, as claimed in claim 1, when said computer program is executed by the processor.

\* \* \* \* \*